United States Patent [19]

Stockburger et al.

[11] Patent Number: 4,472,050
[45] Date of Patent: Sep. 18, 1984

[54] COPYING APPARATUS FOR PRODUCING COMBINED COPIES

[75] Inventors: Hermann Stockburger, St. Georgen; Hans-Georg Winderlich, Villingen; Siegfried Bauer, Furtwangen; Zeljko H. Adamovic, Villingen, all of Fed. Rep. of Germany

[73] Assignee: Lutz H. Prufer, Munich, Fed. Rep. of Germany

[21] Appl. No.: 567,144

[22] Filed: Jan. 3, 1984

Related U.S. Application Data

[63] Continuation of Ser. No. 302,364, Sep. 15, 1981, abandoned.

[30] Foreign Application Priority Data

Mar. 23, 1981 [DE] Fed. Rep. of Germany ....... 3111354

[51] Int. Cl.³ ............................................. G03B 27/52
[52] U.S. Cl. ...................................... 355/40; 235/380; 235/381; 235/382
[58] Field of Search ..................... 355/40, 41; 235/380, 235/381, 382

[56] References Cited

U.S. PATENT DOCUMENTS

| | | | |
|---|---|---|---|
| 3,093,994 | 6/1963 | Richard | 235/382 |
| 3,697,729 | 10/1972 | Edwards et al. | 235/381 |
| 3,815,982 | 6/1974 | Wagensonner | 352/91 |
| 3,818,190 | 6/1974 | Silverman et al. | 235/382 |
| 3,829,661 | 8/1974 | Silverman et al. | 355/41 |
| 3,866,173 | 2/1975 | Moorman et al. | 235/382 |
| 4,012,122 | 3/1977 | McVeigh | 355/40 |
| 4,025,759 | 5/1977 | Scheffel | 235/380 |
| 4,029,414 | 6/1977 | Rubenstein | 355/40 |

FOREIGN PATENT DOCUMENTS

| | | |
|---|---|---|
| 2209598 | 9/1972 | Fed. Rep. of Germany . |
| 2925752 | 1/1980 | Fed. Rep. of Germany . |
| 3113581 | 4/1982 | Fed. Rep. of Germany . |

OTHER PUBLICATIONS

Xerox Disclosure Journal, vol. 5, No. 5, pp. 535-536, Sep./Oct. 1980.

*Primary Examiner*—Monroe H. Hayes
*Attorney, Agent, or Firm*—Donald Brown

[57] ABSTRACT

A copying apparatus is disclosed in which an information derived from an external information source may be combined with an original to be copied. The imaging arrangement of the copying apparatus comprises an arrangement for blocking at least selected portions of the light path between the original and the image to be formed by the imaging optics. The light path blocking arrangement is preferably formed by an LCD-layer associated with the platen on which the original to be copied is laid, the LCD-element being placed under the control of the external information source.

5 Claims, 3 Drawing Figures

COPYING APPARATUS FOR PRODUCING COMBINED COPIES

This application is a continuation of application Ser. No. 302,364, filed Sept. 15, 1981, now abandoned.

BACKGROUND OF THE INVENTION

The invention generally relates to a copying apparatus for producing combined copies, more particularly for producing copies of an original into which an information from an external information source is included to generate combined copies.

Conventional copying machines for producing combined copies from an original and an external information source comprise, in addition to the imaging optics for projecting an image of the original onto a photo-sensitive member, a reproduction device which may be formed as a Laser scanner or optic imaging apparatus. A mechanical masking arrangement is provided for at least partially masking an original laid on an original supporting platen. The reproduction arrangement forms an image on the masked portion. This prior art device is complex in production and in operation, as an additional masking mechanism is required and the desired combination may only be achieved in case the adjustment of the masking members is made correctly.

OBJECTS OF THE INVENTION

A primary object of the invention is to provide a copying apparatus for producing combined copies from an original and an information derived from an external information source, in which manufacture and operation are considerably simplified.

A related object of the invention is to provide a copying apparatus of the above mentioned type having low manufacturing cost and reliable operation.

SUMMARY OF THE INVENTION

In accordance with the invention, the copying apparatus has an original supporting member preferably formed as a composite glass platen, optical imaging means for forming an image of the original laid on the composite glass platen, means for producing copies of the image produced by the optical imaging means, means for generating an information derived from an external information source and combining means for combining the information with an image of the original on the copy to be produced. In accordance with an important feature of the invention, at least selected portions of the light path in the imaging means between the original and the image to be formed are blocked, so that selected portions of the original are effectively masked. For blocking the light path or masking the original, a liquid cristal display (LCD) element is preferably used. This LCD-element is placed under the control of the external information source.

BRIEF DESCRIPTION OF THE DRAWINGS

Further features, objects and advantages of the invention will stand out from the following description of non-limitative exemplary embodiments of the invention with reference to the drawings. In the drawings.

Figure 1:
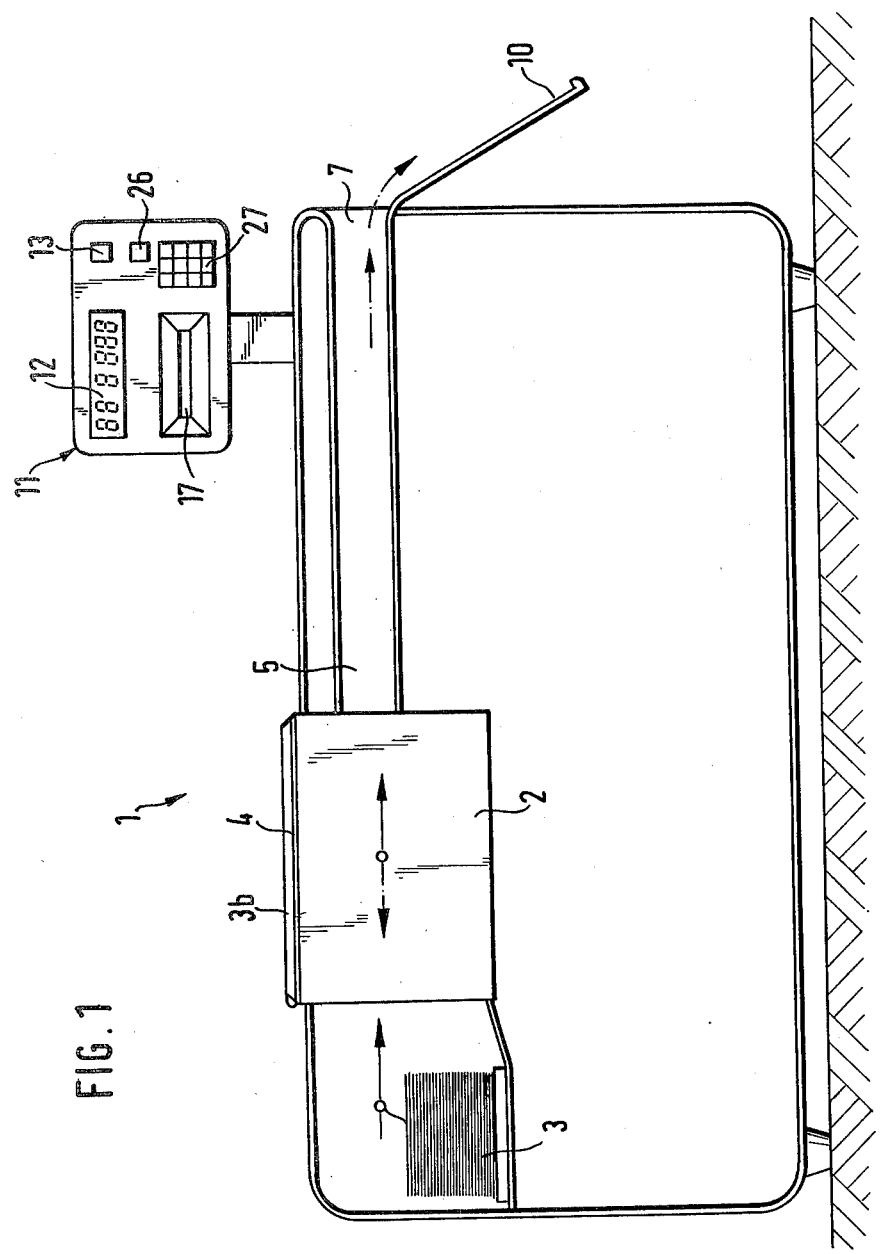
FIG. 1 is a lateral view of a copying apparatus, one side wall being omitted.

In the copying apparatus 1 shown in FIG. 1, the front wall facing the user is omitted for clarity. In conventional manner, the copying apparatus comprises a copying station 2 of conventional type, a paper supply station 3 for providing paper to the copying station and a support 4 for the originals to be reproduced with the copying apparatus. The output side of the copying station 2 is followed by a conveying channel 5 connected with a copy delivery opening 7 and a collecting container 10 for receiving completed copies. The copying apparatus is provided with a control panel 11 having a display 12 and a button 13 for starting the copying operation. The actual control of the data processing portion is integrated into the control panel 11.

Figure 2:
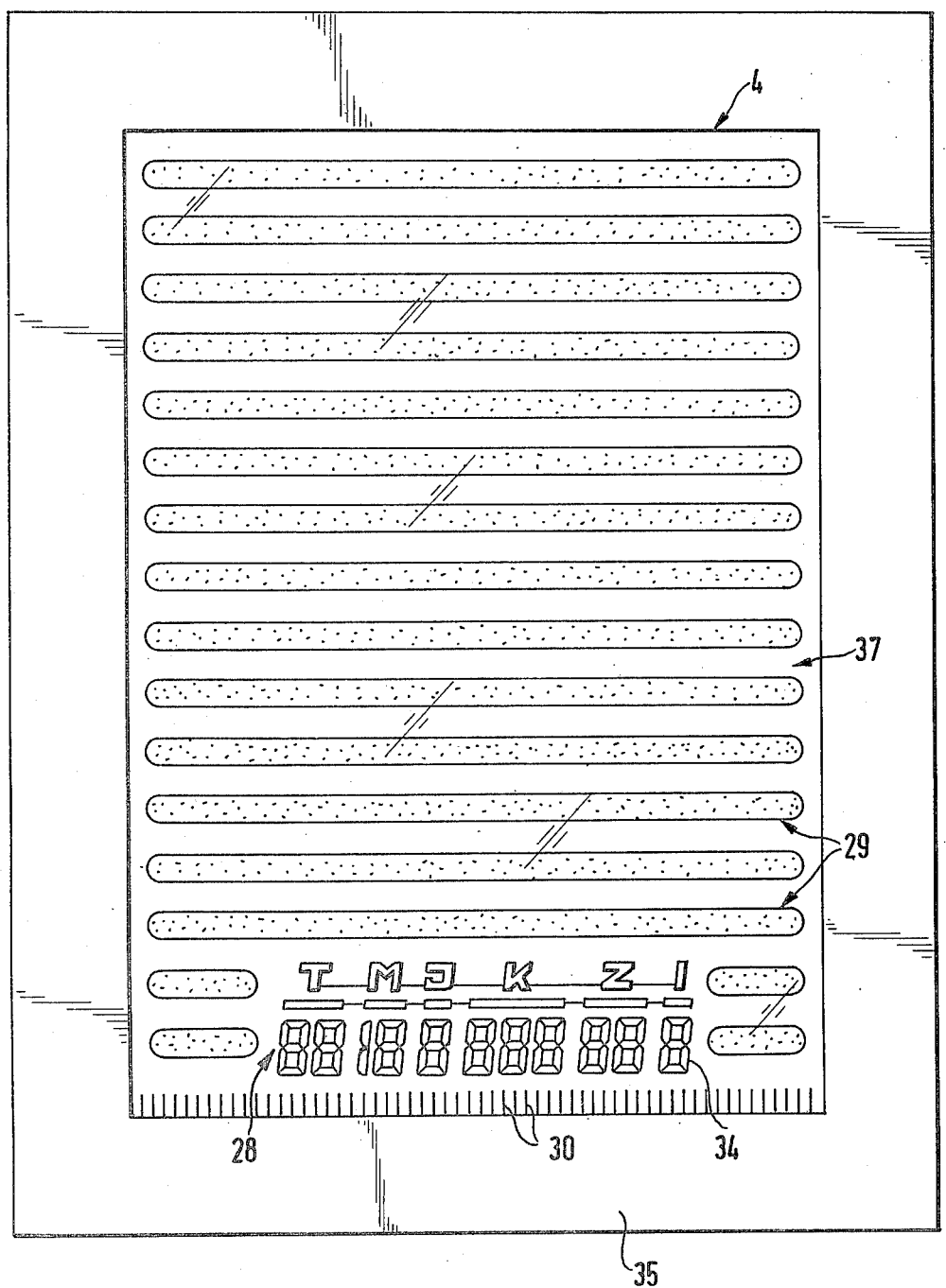
FIG. 2 is a plan view of a support of the apparatus shown in FIG. 1.
Figure 3:
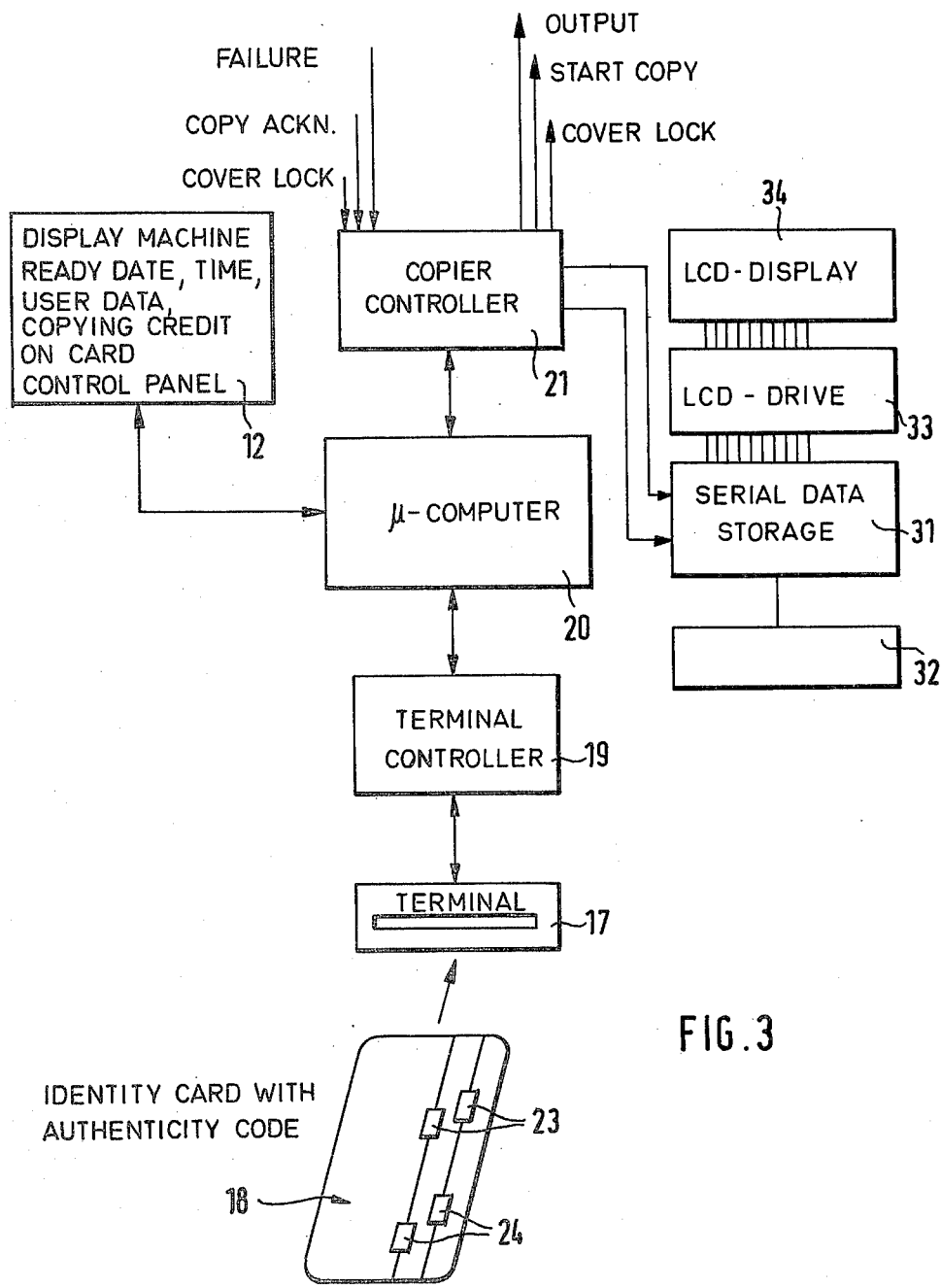
FIG. 3 is a diagrammatic view of the interconnected data processing and control elements of the FIG. 1 embodiment.

The support 4 of the copying station 2 has the form of a composite glass plate held in a frame 35 (cf. FIG. 2). The composite glass plate comprises a layer 37 of liquid cristals. A first zone 28 of these liquid cristals forms an LCD-display 34, for example indicating day, month, year, customer number, time, institution or any other user information. The remaining zone of the support 4 is possibly completely covered by a second zone 29 of liquid cristal segments. At one end of the support, connections 30 arranged outside the light path are provided with lines leading towards an LCD-driver 33 and a voltage supply 32 for connecting the two zones 28, 29. The control panel 11 comprises a terminal 17 for receiving and processing an authorization card 18. The terminal is connected to a controller 19 for that terminal, and further connected to a micro-computer 20. The micro-computer 20 is connected both with the display 12 and with a controller 21 of the copying station 2. A serial data storage 31 is connected to the controller 21 through a data line and a clock line. Its operating voltage is supplied by the voltage supply 32 of the copying apparatus. On its output side, it is connected to the LCD-drive 33 in turn connected with the LCD-display 34 of the zones 28, 29.

The authorization card 18 is formed in a manner to contain the data for the authenticity check, i.e. for providing evidence that the card is among the allowed cards, as well as for identification, i.e. for providing evidence with respect to whom the card was delivered, to be read out by the terminal, particularly in coded form and on a magnetic track. Further, the authorization card 18 comprises adjustment members 23, 24 by which the authorized user may adjust a code word only known to himself in the form of a memorized number and/or memorized word. The adjustment of the adjustment members 23, 24 made by the user may be detected by the terminal 17. The data characterizing all of the personal code words of the individual authorized persons may be stored within the computer 20. However, it is also possible to mark the authenticity data resulting from the adjustment of the adjustment members 23, 24 on the authorization card itself in a manner to be read by the terminal, so that the terminal and the computer will compare the data eventually marked in coded form on the authorization card with the actual adjustment of the adjustment members, through the personal code word. Only in case of coincidence it will be assumed that the user is actually the authorized person. The terminal is formed in such a manner, that upon restitution of the card, the adjustment members 23, 24 are moved back to a zero-position towards one of the abutment sides so that the authorization card will not be accessible to any third person in a form having the personal adjustment of the adjustment members.

In operation, the user will initially introduce the authorization card 18 into the terminal 17. Through the controller 19 the micro-computer 20 will check the card with respect to the above disclosed features, i.e. with respect to authenticity and permission, particularly whether the user is an authorized person. Upon a positive result the display 12 will signal that the copying station is ready for the copying operation. In the contrary case, the card is refused. The operator will now put the original to be copied on the support 4 and push the button 13 to start the copying operation. Subsequently, a copy will be made.

As long as no data are transmitted from the controller 21 to the serial data storage, the second zone 29 of the liquid cristal is reflective or dark, so that the original eventually laid thereon cannot be reproduced because the supporting surface is reflective, so that the light path is substantially interrupted. By triggering the copying operation through the button 13 and the subsequent control of the serial data storage 31 through the controller 21, a corresponding signal is delivered to the LCD-drive 33 and thus to the LCD-display 34. As a result, the second zone 29 of the liquid cristal will be switched into a transparent state. Simultaneously, the first zone 28 of the LCD-display 34 will display the personal data of the user resulting from the authorization card, and particularly the code word, eventually together with the time and date of making the copy, and thus directed into the light path of the copying apparatus so that they will automatically be recorded on the copy during the copying operation.

At the end of this operation, further copies may be produced in the same manner. Alternately, the operator may cause the restitution of the authorization card from the terminal by pushing a button 26. Simultaneously, the controller 21 may deliver a copying acknowledgement pulse signal to a pulse counter or a debiting station.

By this will be achieved that, on the one hand, only an authorized person may use the copying apparatus, because only the authorized person will known the personal code word and may enable the use of the copying apparatus. On the other hand, it will be ensured that the person who made the copy may be determined. As any third person would not know the personal code of the authorized persons, any third person would be prevented from using an authorization card to enable a copying operation, and more particularly, it will be prevented that an authorized person will be marked on a copy as the user if he is not the actual user.

In accordance with another embodiment, the personal code word may be introduced through a keyboard 27 provided on the control panel. A drawback of this embodiment, however, is that third persons may observe the introduction of the code word and use the knowledge of this code word to produce non-authorized copies.

The controller 21 and the serial data storage 31 will simultaneously perform a counting operation of the successive number of the copies made on the copying apparatus. The LCD-display of the first zone 28 will preferably indicate this number. In this manner, each copy is associated with a number marked on the copy to be stored by the fading-in together with the information identifying the user. Simultaneously, the counter printer will deliver a signal through the LCD-drive and the controller 21 to the controller 19 causing the number of the stored copies to be marked on the authorization card 18 within the terminal 17. This number may be marked on the magnetic strip of the authorization card or in the form of an imprinted number. In that case, the authorization card is preferably formed as a value card, i.e. the magnetic strip contains, in addition to the data characterizing the user and the card, data which indicate a maximum number of copies to be made by the authorized persons. The controller 19 is formed to rerecord, through the terminal 17, the previous copying volume minus the number of the copies made, after each copying operation.

In order to prevent the controller 21 from being by-passed to prevent evidence with respect to the performed copying operations, the voltage supply of a serial data storage 31 is taken from the voltage supply 32 of the copying apparatus, together with the LCD-drive 33 and the LCD-display.

Further, by-passing will be prevented by the fact that the second zone 29 covering as much as possible of the copying zone in the above disclosed manner will be reflective without control by the controller 21 to interrupt the light path. Preferably, a connection between the controller 21 and a device for keeping a cover 76 closed on the support 4 may be provided. The controller is formed to deliver signals for making a copy only in case the cover is maintained in a closed state. This will prevent originals to be changed during the copying operation.

As an information derived from an external information source, not only an information identifying a person may be combined with the original on the copy to be produced thereof, but any other kind of information. The additional information to be applied on the copies may be introduced using a data carrier such as an authorization card or the keyboard 27. In addition, the liquid cristal layer 37 may cover the total surface of the platen forming the original supporting member. However, the layer 37 may cover only a portion of this surface, particularly in case additional information from the external information source is to be marked only on a portion of the copy to be produced.

It should be understood that the above description is in no way limitative and that many modifications may be brought to the embodiments disclosed without departing from the true spirit of the invention.

What is claimed is:

1. A copy apparatus comprising a control system for receiving and processing an authorization card, said system including means for determining if the user of the card is an authorized person and if the card is authentic, a document support means having portions which normally block at least portions of said document so that the entire document may not be copied, said support portions which block said portions of said document being rendered nonblocking upon said control system determining that the control card is authentic and the user is an authorized person.

2. The apparatus of claim 1 in which said support portion which blocks said document comprises liquid crystals sections which are normally opaque.

3. A copying apparatus comprising an original supporting member having a first zone of normally opaque portions and a second zone of portions for forming a display of indicia, said first zone opaque portions being adapted to become clear when electrically excited and said second zone portions being adapted to become selectively opaque when excited to form a predetermined display of selected indicia, means for generating information from an external information source upon recognition that a user is authorized to cause said first zone opaque portions to become clear and cause selected second zone portions to become opaque to form indicia and cause a copy of said original to be made having said opaque indicia recorded thereon.

4. The apparatus of claim 3 in which said opaque portions of said first zone comprised liquid crystals.

5. A copy apparatus comprising a control panel including a terminal for receiving and processing an authorization card, an electrical energy source, a support for supporting a document thereon, said support including liquid crystal blanking means, said liquid crystal blanking means being normally opaque, control means for said copier machine, optical imaging means for forming an image of said document, said imaging means comprising an optical light path between said document and said image, means for producing copies of said image, said liquid crystal blanking means in said light path coupled to said electrical energy source, said terminal providing a signal to said electrical energy source after recognition of an authentic authorization card to cause said liquid crystal blanking means to become clear to permit a copy of the entire document to be made by said means for producing copies of said original.

* * * * *

UNITED STATES PATENT AND TRADEMARK OFFICE
CERTIFICATE OF CORRECTION

PATENT NO. : 4,472,050

DATED : September 18, 1984

INVENTOR(S) : H. Stockburger, et al.

It is certified that error appears in the above-identified patent and that said Letters Patent is hereby corrected as shown below:

Title sheet (first page):

After "Assignee", delete "Lutz H. Prufer, Munich, Fed. Rep. of Germany".

Signed and Sealed this

Eighth Day of July 1986

[SEAL]

Attest:

DONALD J. QUIGG

Attesting Officer

Commissioner of Patents and Trademarks